(12) United States Patent
Roussel et al.

(10) Patent No.: US 11,603,285 B2
(45) Date of Patent: Mar. 14, 2023

(54) ELEVATOR CAR LOAD MEASUREMENT SYSTEM AND METHOD FOR DETERMINING A LOAD OF AN ELEVATOR CAR

(71) Applicant: Inventio AG, Hergiswil (CH)

(72) Inventors: Frank Olivier Roussel, Lucerne (CH); Oliver Simmonds, Lucerne (CH)

(73) Assignee: INVENTIO AG, Hergiswil NW (CH)

( * ) Notice: Subject to any disclaimer, the term of this patent is extended or adjusted under 35 U.S.C. 154(b) by 685 days.

(21) Appl. No.: 16/493,784

(22) PCT Filed: Mar. 26, 2018

(86) PCT No.: PCT/EP2018/057663
§ 371 (c)(1),
(2) Date: Sep. 13, 2019

(87) PCT Pub. No.: WO2018/178023
PCT Pub. Date: Oct. 4, 2018

(65) Prior Publication Data
US 2020/0130989 A1    Apr. 30, 2020

(30) Foreign Application Priority Data
Mar. 31, 2017    (EP) .................................... 17164301

(51) Int. Cl.
*B66B 1/34*    (2006.01)
*B66B 5/00*    (2006.01)
(Continued)

(52) U.S. Cl.
CPC .......... *B66B 1/3484* (2013.01); *B66B 5/0031* (2013.01); *B66B 5/145* (2013.01);
(Continued)

(58) Field of Classification Search
CPC ..... B66B 1/3484; B66B 5/0031; B66B 5/145; G01G 19/12; G01G 19/18; G01G 23/01
(Continued)

(56) References Cited

U.S. PATENT DOCUMENTS

| 5,004,058 A | * | 4/1991 | Langford ........... G01G 23/3707 73/1.13 |
| 5,750,945 A | | 5/1998 | Fuller et al. |

(Continued)

FOREIGN PATENT DOCUMENTS

| CN | 2105677 U | 5/1992 |
| CN | 201302478 Y | 9/2009 |

(Continued)

OTHER PUBLICATIONS

Computer translation of the "Description" portion of DE 30 42 968 A1 downloaded from the EPO website on May 28, 2022.*

*Primary Examiner* — Randy W Gibson
(74) *Attorney, Agent, or Firm* — William J. Clemens; Shumaker, Loop & Kendrick, LLP

(57) ABSTRACT

An elevator car load measurement system for determining a load of an elevator car includes a plurality of at least two force sensors that are daisy-chained and connected to a controller for determining the load. Each force sensor measures a force exerted by the elevator car on the respective force sensor and generates a frequency signal with a square-wave form, wherein the frequency signal is proportional to the respective measured force. At least one of the force sensors adds a first frequency signal received from the previous force sensor along the daisy chain a second frequency signal generated by the at least one force sensor to generate a frequency sum signal, the last of the force sensors in the daisy chain forwards the frequency sum signal to the controller.

12 Claims, 3 Drawing Sheets

(51) Int. Cl.
  *G01G 19/12*   (2006.01)
  *G01G 19/18*   (2006.01)
  *G01G 23/01*   (2006.01)
  *B66B 5/14*    (2006.01)

(52) U.S. Cl.
  CPC ............ *G01G 19/12* (2013.01); *G01G 19/18* (2013.01); *G01G 23/01* (2013.01)

(58) Field of Classification Search
  USPC .................................................. 177/199, 200
  See application file for complete search history.

(56) References Cited

U.S. PATENT DOCUMENTS

| | | | | |
|---|---|---|---|---|
| 6,576,849 | B2* | 6/2003 | Bliss | G01G 23/01 |
| | | | | 177/199 |
| 7,211,748 | B2* | 5/2007 | Lauke | G01G 19/4142 |
| | | | | 177/199 |
| 8,648,266 | B2* | 2/2014 | Bucher | G01G 23/01 |
| | | | | 177/199 |
| 2001/0034671 | A1* | 10/2001 | Luke | G01G 19/4144 |
| | | | | 705/28 |
| 2011/0232974 | A1* | 9/2011 | Abercrombie | G01G 19/024 |
| | | | | 177/133 |
| 2012/0061190 | A1 | 3/2012 | Brugger et al. | |

FOREIGN PATENT DOCUMENTS

| | | | |
|---|---|---|---|
| CN | 102042864 | A | 5/2011 |
| DE | 3042968 | A1 | 7/1982 |
| JP | 2005003638 | A | 1/2005 |
| WO | 8704787 | A1 | 8/1987 |

* cited by examiner

ELEVATOR CAR LOAD MEASUREMENT SYSTEM AND METHOD FOR DETERMINING A LOAD OF AN ELEVATOR CAR

FIELD

The present invention pertains to an elevator car load measurement system and a method for determining a load of an elevator car.

BACKGROUND

Usually, the load measurement system for measuring/determining the load an elevator car in an elevator system, i.e., the additional weight which is in the elevator car, uses multiple sensors (for example force sensors). The disadvantage of this is that the installation of the multiple sensors, in particular the electric wiring of the multiple sensors, is complex and very costly. Typically, each sensor needs a separate signal line for transmitting the signal to a central controller. This increases the complexity and the costs of installation. Also, a multiplexer box is usually needed to collect the signals from all sensors and to transmit the information to a controller which determines the car load and/or controls the load management of the elevator car. This increases the costs for the elevator car load measurement system further.

There may be a need for an elevator car load measurement system which can be installed technically easily and which has low production costs. There may be also a need for a method for determining a load of an elevator car which can be carried out with a measurement system which can be installed easily and which has low production costs.

SUMMARY

Such needs may be met with the subject-matters of the advantageous embodiments that are defined in the following specification.

According to a first aspect of the present invention, an elevator car load measurement system for determining a load of an elevator car is proposed, wherein the elevator car load measurement system comprises: a plurality of at least two force sensors which are daisy-chained, and a controller for determining the load of the elevator car, wherein each force sensor is adapted for measuring a force exerted directly or indirectly by the elevator car on the respective force sensor and for generating a frequency signal with a square-wave form of an arbitrary duty-cycle, wherein the frequency signal is proportional to the respective measured force, wherein at least one first force sensor of the plurality of force sensors is adapted such that a first frequency signal received from the previous force sensor along the daisy chain is added to a second frequency signal generated by the first force sensor for generating an outputting a frequency sum signal, and wherein at least one force sensor of the at least one first force sensor is adapted for forwarding the frequency sum signal to the controller.

By this, generally, less signal lines and/or less material to transport the frequency signals from the force sensors to the controller are needed. Typically, not every force sensor needs a separate signal line which directly connects the respective force sensor to the controller. In general, only the force sensor at the end of the daisy chain needs a signal line which is directly connected to the controller. Thus, typically, material, installation time and costs are saved. In particular, usually, no multiplexer box for collecting the signals from the sensors is needed. In general, the daisy chain can comprise more than two force sensors, e.g., three or four force sensors. Typically, in each of the force sensors of the daisy chain, the frequency signal of the previous force sensors can be added to the frequency signal of the present force sensor. Usually, the frequency sum signal of the last force sensor in the daisy chain is forwarded to the controller, wherein the frequency sum signal is produced by adding one frequency signal after the other in the force sensors of the daisy chain. In addition, typically, the distances between the force sensors can be very large, since a frequency signal, in particular a square-form wave signal, can be transported without loss of information over long distances. In general, from the frequency sum signal received at the controller, the total weight (i.e., the sum of the forces measured) of the elevator car can be calculated based on the number of waveform edges in a set time period (e.g., one second).

According to a second aspect of the present invention, a method for determining a load of an elevator car via a plurality of force sensors which are daisy-chained is proposed, wherein the method comprises the following steps: —measuring forces exerted directly or indirectly by the elevator car on the force sensors, respectively; —generating frequency signals with a square-wave form, respectively, wherein the frequency signal is proportional to the measured force, respectively; —receiving a first frequency signal received from the previous force sensor along the daisy chain; —adding the first frequency signal to a second frequency signal of the respective force sensor for generating a frequency sum signal; —forwarding the frequency sum signal to the next force sensor along the daisy chain or to a controller; and —determining the load of the elevator car based on the frequency sum signal in the controller.

Generally, with this method less signal lines and/or less material to transport the frequency signals from the force sensors to the controller are needed. Typically, with this method not every force sensor needs a separate signal line which directly connects the respective force sensor to the controller. In general, only the force sensor at the end of the daisy chain needs a signal line which is directly connected to the controller. Thus, typically, this method saves material, installation time and costs. In particular, usually, no multiplexer box for collecting the signals from the sensors is needed. In general, the daisy chain can comprise more than two force sensors, e.g., three or four force sensors. Typically, in each of the force sensors of the daisy chain, the frequency signal of the previous force sensors can be added to the frequency signal of the present force sensor. Usually, the frequency sum signal of the last force sensor in the daisy chain is sent/forwarded to the controller, wherein the frequency sum signal is produced by adding one frequency signal after the other in the force sensors of the daisy chain. In addition, typically, the signals of the force sensors can be sent over large distances between the force sensors, since a frequency signal, in particular a square-form wave signal, can be transported without loss of information over long distances. In general, the controller can calculate from the frequency sum signal received at the controller the total weight (i.e., the sum of the forces measured) of the elevator car based on the number of waveform edges in a set time period.

The adding of the frequency signals in the elevator car load measurement system and/or in the method for determining a load of an elevator car is usually not an AND-association (a logic "AND"-gate).

The adding of the frequency signals in the elevator car load measurement system and/or in the method for determining a load of an elevator car can be carried out as follows: if at least one of the first frequency signal and the second frequency signal has a waveform edge, a waveform edge is generated in the frequency sum signal. I.e., if either one of the first frequency signal and the second frequency signal has a waveform edge at a point of time, the frequency sum signal also has waveform edge at that point of time. Thus, changes (waveform edges) in the square-wave form of the first frequency signal and/or the second frequency signal can be represented by a change of the frequency sum signal (waveform edge). This kind of adding is one possibility for generating and outputting a frequency sum signal based on a first frequency signal and a second frequency signal.

Another possibility for adding a first frequency signal and a second frequency signal in the elevator car load measurement system and/or in the method for determining a load of an elevator car is summing up/adding up the amplitudes of the two frequency signals in the simple mathematical sense, i.e., the amplitude of the frequency sum signal is the mathematical sum of the amplitudes of the first frequency signal and the second frequency signal. E.g., if the first frequency signal and the second frequency signal have a square-wave form, the amplitudes of the respective square-wave form signals can be added in the simple mathematical sense to generate and output a frequency sum signal, wherein the frequency sum signal has a square-wave form with an amplitude which is the sum of the two amplitudes of the first frequency signal and the second frequency signal.

The adding of the first frequency signal and the second frequency signal can be carried out by a simple electronic circuit or by a CPU or an BASIC with a multitude of basic electronic elements. The CPU or BASIC can carry out a complex (logic) function. In particular, the CPU or the BASIC can be programmed such that the adding of the frequency signal is carried out such that if at least one of the first frequency signal and the second frequency signal has a waveform edge at a point of time, a waveform edge is generated in the frequency sum signal at that point of time.

Ideas underlying embodiments of the present invention may be interpreted as being based, inter alias, on the following observations and recognitions.

According to an embodiment, the first frequency signal is added to the second frequency signal by generating a waveform edge in the frequency sum signal at a point of time if the first frequency signal and/or the second frequency signal has a waveform edge at the respective point of time. One advantage hereof is that, in general, no delay in the propagation of the signals across the daisy chain is present. In general, from the frequency sum signal received at the controller, the total weight (i.e., the sum of the forces measured) of the elevator car can be calculated based on the number of waveform edges in a set time period (e.g., one second).

According to an embodiment, the force sensors are adapted such that if the first frequency signal and the second frequency signal have a waveform edge at the same point of time which is a first point of time, one waveform edge in the frequency sum signal is generated at the first point of time and one further waveform edge in the frequency sum signal is generated at a second point of time which lies a delay time after the first point of time, in particular a set delay time after the first point of time. One advantage hereof is that, typically, no information is lost when adding the first frequency signal to the second frequency signal, even if both frequency signals have coincidentally a waveform edge at the same point of time. In general, this increases the reliability of the elevator car load measurement system. This is a further possibility of adding the first frequency signal and the second frequency signal to generate and output the frequency sum signal.

According to an embodiment, the force sensors are adapted such that, if the respective force sensor detects a malfunction, the respective force sensor generates a second frequency signal with a set error frequency, wherein the force sensors are further adapted such that, if the first frequency signal has a frequency which corresponds to the set error frequency, a frequency sum signal with the set error frequency is generated and forwarded. One advantage hereof is that an error/malfunction of one of the force sensors can be transported via the daisy chain, generally. Typically, as soon as at least one force sensors detects an error/malfunction, the controller will receive this information via the daisy chain and can take corresponding measures. Usually, for example, the controller can generate a warning signal and/or stop the operation of the elevator. Generally, one advantage hereof is that, if a force sensor sends an error signal, i.e., an error frequency, the error frequency is forwarded to the controller by the other force sensors without modification. Thus, typically, the information that at least one of the force sensors detected a problem/malfunction is forwarded to the controller reliably. This is a further possibility of adding the first frequency signal and the second frequency signal to generate and output the frequency sum signal.

According to an embodiment, the force sensors are disposed between a car enclosure module and a car traction module of the elevator car, wherein the car enclosure module is held flowingly within the car traction module, wherein the force sensors measure the force exerted by the car enclosure module on the car traction module, respectively. Typically, by this, the load of the elevator car can be determined more precisely.

According to an embodiment, the force sensors are disposed at fix points of suspension traction means for holding and moving the elevator car, wherein the measured forces are forces exerted by the suspension traction means on the force sensors, respectively. In general, by this, the load of the elevator car can be determined technically easily. Furthermore, typically, the force sensors can also be used for monitoring the status of the suspension traction means for increasing the safety of the operation of the elevator car.

According to an embodiment of the method, the first frequency signal is added to the second frequency signal by generating a waveform edge in the frequency sum signal at a point of time if the first frequency signal and/or the second frequency signal has a waveform edge at the respective point of time. One advantage hereof is that, in general, no delay in the propagation of the signals across the daisy chain is present. In general, from the frequency sum signal received at the controller, the total weight (i.e., the sum of the forces measured) of the elevator car can be calculated based on the number of waveform edges in a set time period (e.g., one second).

According to an embodiment of the method, if the first frequency signal and the second frequency signal have a waveform edge at the same point of time which is a first point of time, one waveform edge in the frequency sum signal is generated at the first point of time and one further waveform edge in the frequency sum signal is generated at a second point of time which lies a delay time after the first point of time, in particular a set delay time after the first point of time. Typically, one advantage hereof is that no information is lost when adding the first frequency signal to the second frequency signal, even if both frequency signals have coincidentally a waveform edge at the same point of time. Usually, the reliability of the method is increased this way. This is a further possibility of adding the first frequency signal and the second frequency signal to generate and output the frequency sum signal.

According to an embodiment of this method, if the respective force sensors detects a malfunction, a second frequency signal with a set error frequency is generated by the respective force sensor, and wherein, if the first frequency signal has a frequency which corresponds to the set error frequency, a frequency sum signal with the set error frequency is generated and forwarded. Typically, by this, an error/malfunction of one of the force sensors can be transported via the daisy chain. Generally, as soon as at least one force sensors detects an error/malfunction, the controller will receive this information via the daisy chain and can take corresponding measures. Typically, the controller can generate a warning signal and/or stop the operation of the elevator as corresponding measures. Furthermore, generally, one advantage hereof is that, if a force sensor sends an error signal, i.e., an error frequency, the error frequency is forwarded to the controller by the other force sensors without modification. Thus, usually, the information that at least one of the force sensors detected a problem/malfunction is forwarded to the controller reliably. This is a further possibility of adding the first frequency signal and the second frequency signal to generate and output the frequency sum signal.

According to an embodiment of the method, the measured forces are forces exerted by a car enclosure module on a car traction module of the elevator car, respectively, wherein the car enclosure module is held flowingly within the car traction module. Usually, one advantage hereof is that the load of the elevator car is determined more precisely.

According to an embodiment of the method, the measured forces are forces exerted by suspension traction means on the force sensors at fix points of the suspension traction means, respectively, wherein the suspension traction means hold and move the elevator car. Typically, one advantage hereof is that the load of the elevator car is determined technically easily. Also, generally, the force sensors which generate the frequency signals to determine the car load can also be used for monitoring the status of the suspension traction means for increasing the safety of the operation of the elevator car.

Usually, the suspension traction means can comprise a rope and/or a belt, respectively.

Typically, the plurality of force sensors can comprise two force sensors, three force sensors, four force sensors, five force sensors or more than five force sensors (e.g., six, seven or eight force sensors).

In the following, advantageous embodiments of the invention will be described with reference to the enclosed drawing. However, neither the drawing nor the description shall be interpreted as limiting the invention.

The figures are only schematic and not to scale. Same reference signs refer to same or similar features.

DETAILED DESCRIPTION

Figure 1:
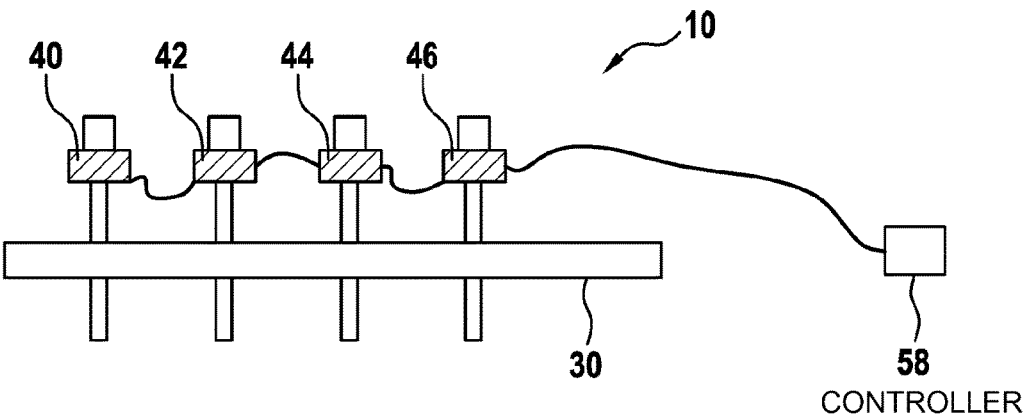
FIG. 1 shows a schematic view of a first embodiment of an elevator car load measurement system according to the present invention.
Figure 2:
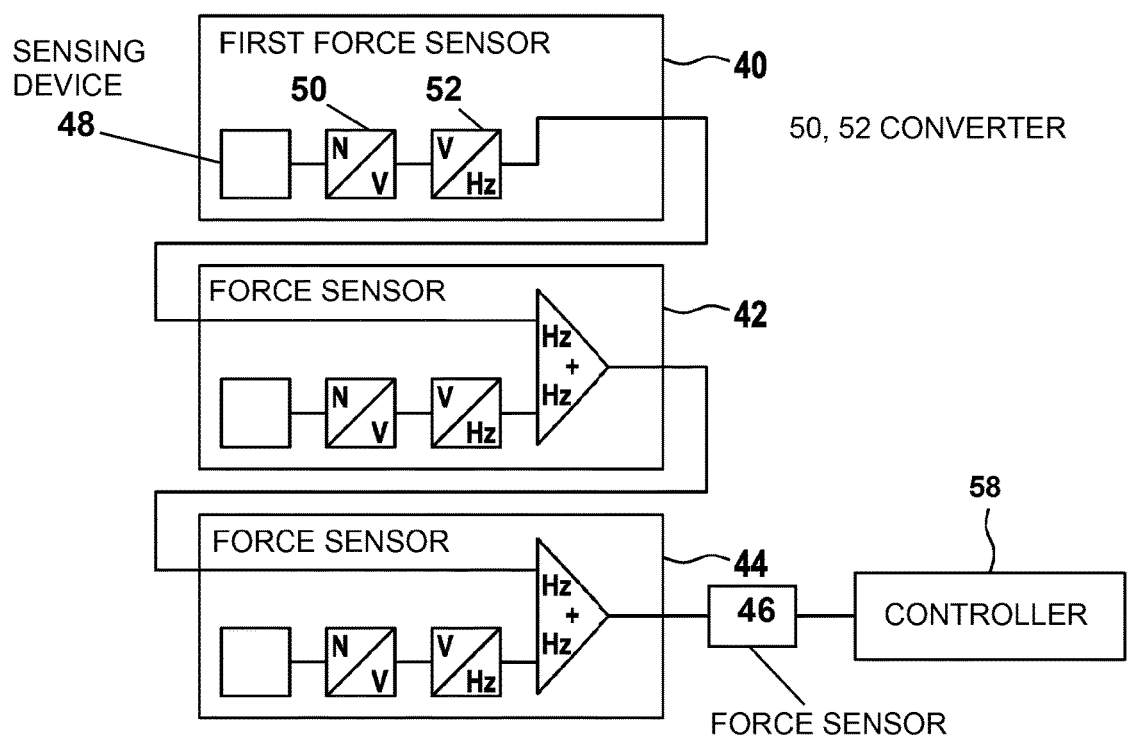
FIG. 2 shows a schematic view of a daisy chain of the force sensors.

FIG. 1 shows a schematic view of a first embodiment of an elevator car load measurement system 10 according to the present invention. FIG. 2 shows a schematic view of a daisy chain of the force sensors 40, 42, 44, 46.

The elevator system comprises an elevator car 12 (FIG. 4) which is held movably by one or more suspension traction means. At the fix point 30 of the suspension traction means of the elevator car 12, force sensors 40, 42, 44, 46 are installed. The force sensor 40, 42, 44, 46 measures the force exerted on the suspension traction means, respectively. In FIG. 1, four force sensors 40, 42, 44, 46 are installed. Each force sensor 40, 42, 44, 46 measures the force exerted on one of the suspension traction means. Thus, there are four suspension traction means which hold the elevator car 12.

The force sensors 40, 42, 44, 46 are daisy chained, i.e., are connected in series. This means that each force sensor 40, 42, 44, 46 is connected with another force sensor such that all force sensors 40, 42, 44, 46 are connected along a chain. The signal of one of the force sensors 40, 42, 44 is sent to the next force sensor 42, 44, 46 in the daisy chain until the last force sensor 46 in the daisy chain sends the signal to the controller 58.

The force sensor 40, 42, 44, 46 converts the measured force into a frequency. This conversion can be done in several steps as shown in FIG. 2. First, the measured force generated by a sensing device 48 is converted into a voltage (e.g., via a Whetstone bridge 50) which is proportional to the measured force. Then, the voltage is converted into a frequency by a converter 52. The wavelength of the frequency generated by the respective force sensor 40, 42, 44, 46 is proportional to the force measured by the sensing device of the respective force sensor 40, 42, 44, 46.

The frequency signals are rectangular waveform signals, respectively.

The first force sensor 40 is connected with a second force sensor 42. The second force sensor 42 is connected with a third force sensor 44. The third force sensor 44 is connected to a fourth force sensor 46. The fourth force sensor 46 is connected to a controller 58.

The first frequency signal 80 (FIG. 3) with a first frequency is forwarded/sent to the second force sensor 42. The second force sensor 42 measures the force exerted on the second force sensor 42. The measured force is converted to a second frequency signal 82, wherein the frequency of the second frequency signal 82 is proportional to the measured force. The first frequency signal 80 is added to the second frequency signal 82 by the second force sensor 42.

Figure 3:
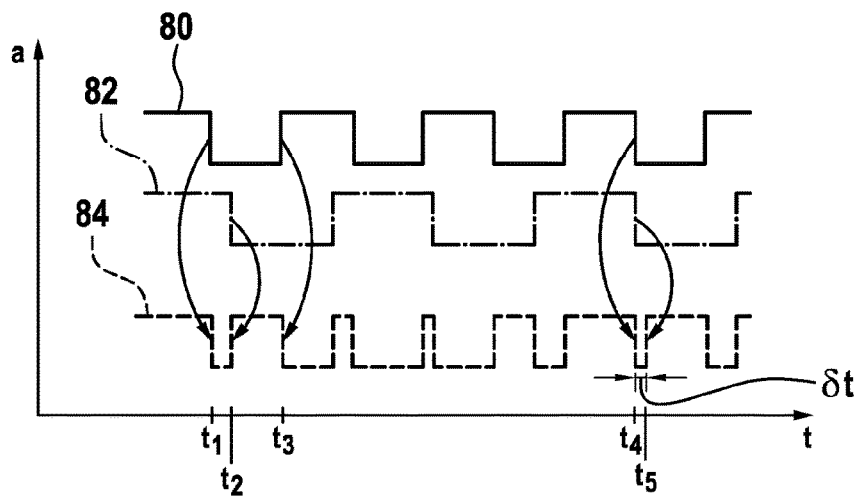
FIG. 3 shows a schematic diagram of the first frequency signal, the second frequency signal and the frequency sum signal.

The "+"-signs in FIG. 2 indicate that the frequency signals 80, 82, 84 are added as shown in FIG. 3. The addition is carried out as follows: if at least one of the first frequency signal 80 and the second frequency signal 82 has a waveform edge, a waveform edge is generated in the frequency sum signal 84. I.e., if either one of the first frequency signal 80 and the second frequency signal 82 has a waveform edge at a point of time, the frequency sum signal 84 also has waveform edge at that point of time. Thus, changes (waveform edges) in the square-wave form of the first frequency signal 80 and/or the second frequency signal 82 can be represented by a change of the frequency sum signal 84 (waveform edge). This way, the frequencies of the two square-wave form frequency signals are added which is indicated by the "Hz+Hz" in FIG. 2, i.e., the number of waveform edges in the frequency sum signal 84 per time unit equals the number of waveform edges in the first frequency signal 80 per time unit plus the number of waveform edges in the second frequency signal 82 per time unit.

The devices denoted with "Hz+Hz" in FIG. 2 can comprise one or several simple logic devices and/or can comprise one or several CUPS and/or BASICS. The CPU or BASIC can carry out a complex (logic) function. In particular, the simple logic device, the CPU and/or BASIC can be adapted such or programmed such that the adding of the frequency signals is carried out as described in the following in connection with FIG. 3.

The addition of the first frequency signal 80 and the second frequency signal 82 is shown in FIG. 3. FIG. 3 shows a schematic diagram of the first frequency signal 80, the second frequency signal 82 and the frequency sum signal 84.

The frequency signals 80, 82, 84 (first frequency signal 80, the second frequency signal 82 and frequency sum signal 84) are drawn shifted along the y-axis in FIG. 3. This shift of the different frequency signals 80, 82, 84 along the y-axis of FIG. 3 is for illustration purposes only, i.e., to show all frequency signals 80, 82, 84 in a single diagram. Usually, in reality, there is no shift of the amplitudes between the frequency signals 80, 82, 84, but the maximum amplitudes and the minimum amplitudes of all frequency signals 80, 82, 84 are the same.

At the points of time where either one of the first frequency signal 80 and the second frequency signal 82 or both has/have a waveform edge, a waveform edge is generated in the frequency sum signal 84. In particular, a waveform edge is a change of the amplitude from 0 (minimum amplitude) to 1 (maximum amplitude) as well as a change of the amplitude from 1 (maximum amplitude) to 0 (minimum amplitude).

E.g., at point of time $t_1$, the first frequency signal 80 has a waveform edge. Thus, a waveform edge in the frequency sum signal 84 at the point of time $t_1$ is generated. At the point of time $t_2$, the second frequency signal 82 has a waveform edge. Thus, a waveform edge in the frequency sum signal 84 at the point of time $t_2$ is generated. At point of time $t_3$, the first frequency signal 80 has a waveform edge. Thus, a waveform edge in the frequency sum signal 84 at point of time $t_3$ is generated. And so on.

If there is a waveform edge at the same point of time in both the first frequency signal 80 and the second frequency signal 82, e.g., at point of time $t_4$, then a waveform edge in the frequency sum signal 84 at the point of time $t_4$ is generated and a further waveform edge in the frequency sum signal 84 is generated at the point of time $t_4+\delta t=t_5$ is generated. I.e., the further waveform edge is delayed by a preset delay time $\delta t$. Thus, no information is lost. Also, the minimum duty cycle of the maximum expected frequency is guaranteed this way.

The frequency sum signal 84 is forwarded/sent from the second force sensor 42 to the third force sensor 44. The third force sensors 44 measures the force exerted on the third force sensor 44. The measured force is converted to a third frequency signal, wherein the frequency of the third frequency signal is proportional to the measured force. The frequency sum signal 84 received from the second force sensor 42 is added to the third frequency signal.

The addition of the frequency sum signal 84 to the third frequency is done according to the addition of the first frequency signal 80 to the second frequency signal 82. I.e., each time the received frequency sum signal 84 and/or the third frequency signal has a waveform edge, a waveform edge is generated in the frequency sum signal 84 to be outputted by the third force sensor 44. The newly generated frequency sum signal 84 of the third force sensor 44 is sent to the fourth force sensor 46.

The fourth force sensor 46 measures the force exerted on the fourth force sensor 46. The measured force is converted to a fourth frequency signal, wherein the frequency of the fourth frequency signal is proportional to the measured force. The frequency sum signal 84 received from the third force sensor 44 is added to the fourth frequency signal. The addition of the frequency sum signal 84 to the fourth frequency is done according to the addition of the first frequency signal 80 to the second frequency signal 82. I.e., each time the received frequency sum signal 84 and/or the fourth frequency signal has a waveform edge, a waveform edge is generated in the frequency sum signal 84 to be outputted by the fourth force sensor 46. The newly generated frequency sum signal 84 of the fourth force sensor 46 is sent to the controller 58.

This way, no delay in the propagation of the signals across the daisy chain is present. As soon as a waveform edge is detected in one of the frequency signals to be added, a waveform edge is generated in the frequency sum signal 84 which is output by the force sensor 40, 42, 44, 46. The force sensor 40, 42, 44, 46 does not have to monitor the received frequency signal for a set amount of time to determine the frequency of the frequency signal.

Also, more than four (e.g., five, six or more than five) force sensors 40, 42, 44, 46 can be daisy chained this way.

The last force sensor 46 in the daisy chain can have a CAN (Controller Area Network) interface. The frequency sum signal 84 can be sent to the controller 58 and via the CAN interface to other devices.

The controller 58 can be part of a central control unit of the elevator/elevator system.

Each force sensor 40, 42, 44, 46 can have a strain gauge (e.g. Sensing device 40.1). Each force sensor 40, 42, 44, 46 of the daisy chain has the same sensitivity, e.g., 1.25 Hz/N. It can have an offset when no force is applied, e.g. 8 k Hz for a force of zero Newton.

The waveform edge is a change from 0 to 1 or from 1 to 0, i.e., a rising or falling edge.

If one of the force sensors 40, 42, 44, 46 has a problem/malfunction, it generates a frequency signal with a set error frequency. The set error frequency corresponds to a frequency normally not generated, i.e., a frequency which does not correspond to a normally measured force. The set error frequency can be a very high frequency or a very low frequency (e.g., 4 kHz or 0 Hz).

If the respective force sensor 42, 44, 46 receives a frequency signal with the set error frequency from the previous force sensor 40, 42, 44 along the daisy chain, the received frequency signal is not added to the frequency signal generated in this force sensor 42, 44, 46, but the force sensor 42, 44, 46 generates a frequency sum signal 84 with the set error frequency. This way, if one force sensor 40, 42, 44, 46 generates a frequency signal with the set error frequency, this signal is forwarded unchanged along the daisy chain and finally received by the controller 58. If the controller 58 receives a signal with the set error frequency, a warning signal is generated and/or the operation of the elevator car 12 is stopped.

The controller 58 receives a frequency sum signal 84 which contains information from all force sensors 40, 42, 44, 46. I.e., the frequency sum signal 84 comprises all information about the load of the elevator car 12. The frequency sum signal 84 is sent from the last force sensor 46 in the daisy chain to the controller 58. The controller 58 analyzes the frequency sum signal 84 by determining the number of waveform edges in a set time period (e.g., 1 second). The number of waveform wedges in this set time period is proportional to the sum of the forces measured by the force sensors 40, 42, 44, 46. The sensitivity of the force sensors 40, 42, 44, 46, i.e., which frequency corresponds to which measured force, is known. Since, the weight of the empty elevator car 12 is known, the load of the elevator car 12 can be determined.

The forces exerted on the suspension traction means can change over time, but the overall sum remains the same if the load of the elevator car 12 stays the same.

It is also possible that two frequency signals are received by a pair of force sensors (which generate two frequency signals) and the four frequency signals (two frequency signals from one or two force sensors before in the daisy chain and the two frequency signals of the two force sensors at this point in the chain) are added together in one step. The adding of the four frequency signals would be similar to the adding of two frequency signals. If one or more of the four frequency signals has a waveform edge (i.e., a step from 0 to 1 or from 1 to 0) at a point of time (e.g., t=$t_6$), a waveform edge is generated in the frequency sum signal 84 at this point in time (t=$t_6$).

If two frequency signals have a waveform edge at the same point in time, one waveform edge in the frequency sum signal 84 is generated at this point in time (t=$t_6$) and a further/second waveform edge in the frequency sum signal 84 is generated a set delay time δt later (t=$t_6$+δt). The same applies correspondingly, if three frequency signals have a waveform edge at the same point in time. A first waveform edge in the frequency sum signal 84 is generated at that point of time (e.g., t=$t_7$), a second waveform edge in the frequency sum signal 84 is generated a set delay time δt later (t=$t_7$+δt) and a third waveform edge is generated two delay times δt later than the first waveform edge (t=$t_7$+δt+δt). The same is applied correspondingly, if all four frequency signals have a waveform edge at the same point of time.

All waveform edges in either the received first frequency signal 80 or in the second frequency signal 82 (generated by the respective force sensors 40, 42, 44, 46) are passed on/transferred to the frequency sum signal 84 which is sent to the next force sensor 42, 44, 46 along the daisy chain or the controller 58 (if the respective force sensor 40, 42, 44, 46 is the last force sensor in the daisy chain).

The delay time δt is chosen/set such that the minimal duty cycle of the maximum expected frequency is guaranteed.

The frequency sum signal 84 which is sent by one force sensor 40, 42, 44 in the daisy chain to the next force sensor 42, 44, 46 can be the so-called first frequency signal 80. This so-called first frequency signal 80 is then added to the second frequency signal 82, wherein the so-called second frequency signal 82 is the frequency signal generated in that respective force sensor 40, 42, 44, 46 (based on the measured force).

Figure 4:
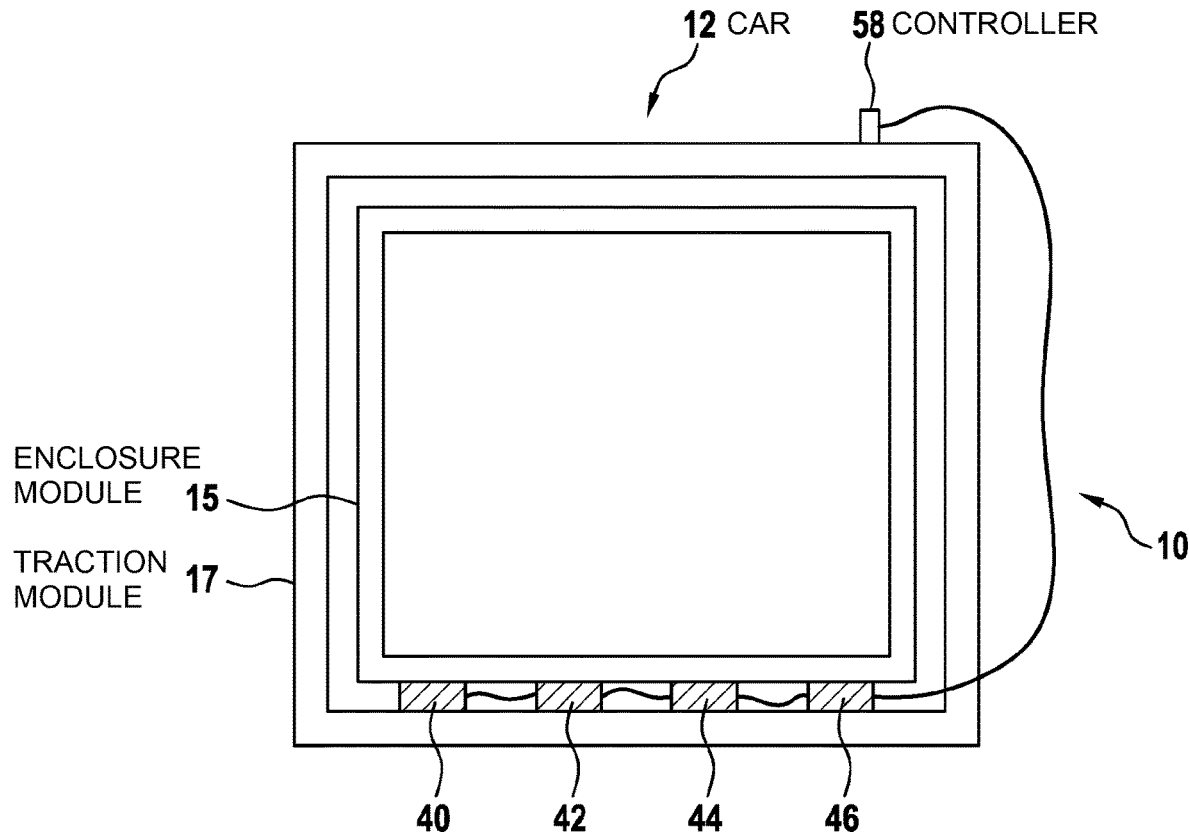
FIG. 4 shows a schematic view of a second embodiment of an elevator car load measurement system according to the present invention.

FIG. 4 shows a schematic view of a second embodiment of an elevator car load measurement system 10 according to the present invention. In this embodiment, the elevator car 12 comprises a car enclosure module 15 which is disposed within a car traction module 17. The car enclosure module 15 is held flowingly within the car traction module 17. This means, that the car enclosure module 15 can move relative to the car traction module 17. The car traction module 17 is connected to the suspension traction means. The car to transport persons and/or goods is located inside the car enclosure module 15.

In this embodiment, the force sensors 40, 42, 44, 46 are disposed between the car enclosure module 15 and the car traction module 17 of the elevator car 12. In particular, the force sensors 40, 42, 44, 46 are disposed below the car enclosure module 15 along the direction of gravity (the direction of gravity runs in FIG. 4 from top to bottom). The force sensors 40, 42, 44, 46 are daisy chained and connected to a controller 58 which is located at the car traction module 17. The controller 58 determines based on the frequency sum signal 84 the load of the elevator car 12.

The forces measured at the respective force sensors 40, 42, 44, 46 can change over time. E.g., when a person moves from one side of the car enclosure model to the other side. However, the sum of the forces exerted on the force sensors 40, 42, 44, 46 stays the same, as long as the load of the elevator car 12 stays the same.

Figure 5:
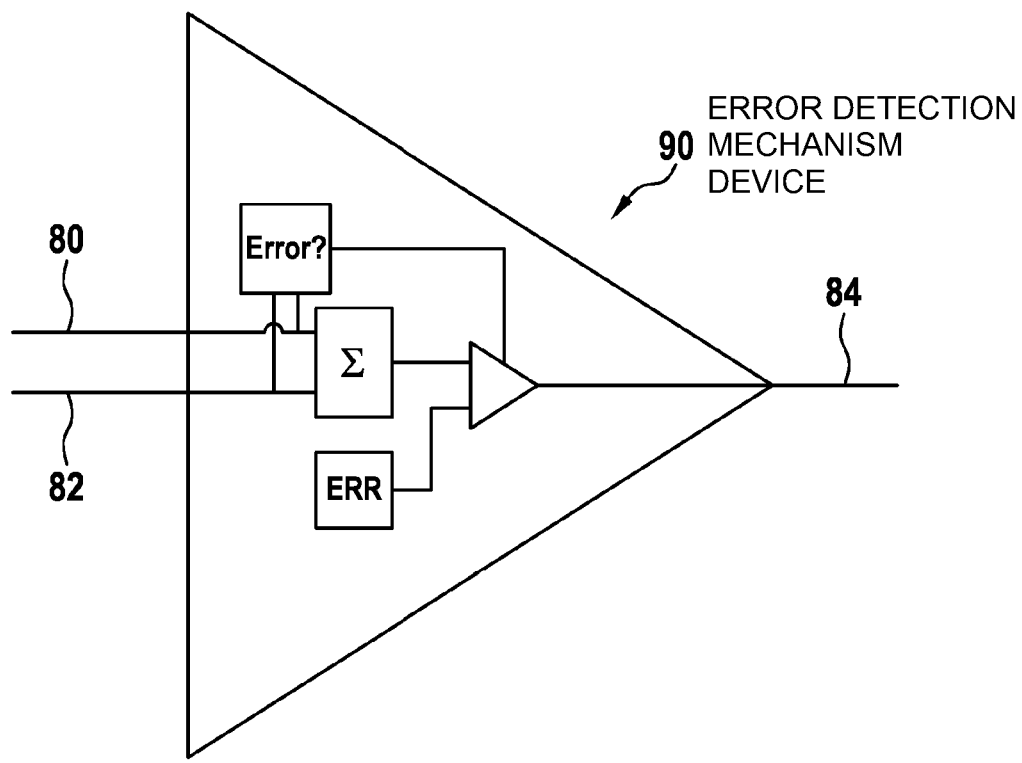
FIG. 5 shows an error detection mechanism device.

FIG. 5 shows an error detection mechanism device 90. The error detection mechanism device 90 can be part of one or several force sensors 40, 42, 44, 46. The summation/outputting of the frequency sum signal of the force sensor 40, 42, 44, 46 can be monitored with the error detection mechanism 90: if the frequency of the first frequency signal 80 (which is received from the previous force sensor 40, 42, 44, 46 in the daisy chain) is out of range, or has a specific error frequency ERR (e.g., 0 Hz for no signal/force sensor 40, 42, 44, 46 broken or 4 kHz for overload of the force sensor 40, 42, 44, 46) then a frequency sum signal 84 with a frequency corresponding to the error frequency ERR is generated and forwarded to the next force sensor 42, 44, 46 in the daisy chain or to the controller 58. If the frequency of the first frequency signal 80 neither is out of range nor has a specific error frequency ERR, the frequency sum signal is generated by adding the first frequency signal 80 to the second frequency signal 82 as described above.

Finally, it should be noted that the term "comprising" does not exclude other elements or steps and the "a" or "an" does not exclude a plurality. Also, elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

REFERENCE LIST 10 elevator car load measurement system
12 elevator car
15 car enclosure module
17 car traction module
30 fix point
40 first force sensor
42 second force sensor
44 third force sensor
46 fourth force sensor
48 sensing device (strain gauge)
50 force to voltage converter
52 voltage to frequency converter 58 controller
80 first frequency signal
82 second frequency signal
84 frequency sum signal
90 error detection mechanism device
$t_1, t_2, t_3, t_4, t_5$ points of time
$\delta t$ delay time

The invention claimed is:

1. An elevator car load measurement system for determining a load of an elevator car, the elevator car load measurement system comprising:
    a plurality of force sensors connected together in a daisy chain including a first force sensor connected to one end of the daisy chain and a last force sensor connected to an opposite end of the daisy chain;
    a controller connected to the last force sensor for determining the load of the elevator car;
    wherein each of the force sensors measures a force exerted thereon by the elevator car and generates a frequency signal with a square-wave form, wherein a frequency of the frequency signal is proportional to the measured force;
    wherein a first force sensor generates the frequency signal as a first frequency signal and sends the first frequency signal to a second force sensor in the daisy chain, wherein the second force sensor adds the first frequency signal with a second frequency signal being the frequency signal generated by the second force sensor to generate a frequency sum signal and sends the frequency sum signal to a next one of the force sensors in the daisy chain;
    wherein each of the force sensors connected between the second force sensor and the controller adds the frequency sum signal received from an adjacent one of the force sensors in the daisy chain with the frequency signal generated by it to generate a new frequency sum signal;
    wherein the last force sensor forwards the new frequency sum signal generated by it to the controller for controlling the elevator car; and
    wherein each of the force sensors generates a set error frequency signal in response to detecting a malfunction of the force sensor, and wherein each of the force sensors receiving the set error frequency signal from another of the force sensors does not add the frequency signal to generate the frequency sum signal or the new frequency sum signal.

2. The elevator car load measurement system according to claim 1 wherein the first frequency signal is added to the second frequency signal by generating a waveform edge in the frequency sum signal at a point of time if at least one of the first frequency signal and the second frequency signal has a waveform edge at the point of time.

3. The elevator car load measurement system according to claim 2 wherein the second force sensor is adapted such that if each of the first frequency signal and the second frequency signal have a waveform edge at a same first point of time, one waveform edge in the frequency sum signal is generated at the first point of time and another waveform edge in the frequency sum signal is generated at a second point of time which is a predetermined delay time after the first point of time.

4. The elevator car load measurement system according to claim 1 wherein the force sensors are disposed between a car enclosure module and a car traction module of the elevator car, wherein the car enclosure module is held floatingly within the car traction module, and wherein the force sensors measure the force exerted by the car enclosure module on the car traction module.

5. The elevator car load measurement system according to claim 1 wherein the force sensors are disposed at fix points of a suspension traction means for holding and moving the elevator car, and wherein the measured forces are forces exerted by the suspension traction means on the force sensors.

6. A method for determining a load of an elevator car utilizing a plurality of force sensors that are connected together in a daisy chain, the method comprising the steps of:
    measuring forces exerted by the elevator car on the force sensors;
    generating by each of the force sensors a frequency signal with a square-wave form, wherein a frequency of the frequency signal is proportional to the force measured by the force sensor;
    receiving at each of the force sensors, except at a first one of the force sensors in the daisy chain, an output signal generated from a previous one of the force sensors in the daisy chain;
    each of the force sensors, except the first force sensor, adding the output signal received from the previous force sensor to the frequency signal generated thereby to generate a frequency sum signal as the output signal generated by it;
    a last one of the force sensors in the daisy chain forwarding the frequency sum signal to a controller;
    determining the load of the elevator car utilizing the controller based on the frequency sum signal forwarded to the controller; and
    when one of the force sensors detects a malfunction, generating a set error frequency signal from the one force sensor and substituting the set error frequency signal for the frequency signal to generate the frequency sum signal.

7. The method according to claim 6 including adding the output signal to the frequency signal by generating a waveform edge in the frequency sum signal at a point of time if at least one of the output signal and the frequency signal has a waveform edge at the point of time.

8. The method according to claim 7 wherein if the output signal and the frequency signal have a waveform edge at a same point of time that is the first point of time, generating one waveform edge in the frequency sum signal at the first point of time and another waveform edge in the frequency sum signal at a second point of time which is a predetermined delay time after the first point of time.

9. The method according to claim 6 including positioning the force sensors to measure forces exerted by a car enclosure module on a car traction module of the elevator car, wherein the car enclosure module is held floatingly within the car traction module.

10. The method according to claim 6 wherein the measured forces are forces exerted by a suspension traction means on the force sensors at fix points of the suspension traction means, wherein the suspension traction means hold and move the elevator car.

11. An elevator car load measurement system for determining a load of an elevator car, the elevator car load measurement system comprising:
    a plurality of force sensors connected together in a daisy chain including a first force sensor connected to one end of the daisy chain and a last force sensor connected to an opposite end of the daisy chain;

a controller connected to the last force sensor for determining the load of the elevator car;

wherein each of the force sensors measures a force exerted thereon by the elevator car and generates a frequency signal with a square-wave form, wherein a frequency of the frequency signal is proportional to the measured force;

wherein a first force sensor generates the frequency signal as a first frequency signal and sends the first frequency signal to a second force sensor in the daisy chain, wherein the second force sensor adds the first frequency signal with a second frequency signal being the frequency signal generated by the second force sensor to generate a frequency sum signal and sends the frequency sum signal to a next one of the force sensors in the daisy chain;

wherein each of the force sensors connected between the second force sensor and the controller adds the frequency sum signal received from an adjacent one of the force sensors in the daisy chain with the frequency signal generated by it to generate a new frequency sum signal;

wherein the last force sensor forwards the new frequency sum signal generated by it to the controller for controlling the elevator car; and wherein each of the force sensors generates a set error frequency signal in response to detecting a malfunction of the force sensor, wherein each of the force sensors receiving the set error frequency signal from another of the force sensors does not add the set error frequency signal to generate the frequency sum signal or the new frequency sum signal, and wherein each of the force sensors receiving the set error frequency signal generates the set error frequency signal in place of the new frequency sum signal.

12. A method for determining a load of an elevator car utilizing the elevator car load measurement system according to claim 11, the method comprising the steps of:

measuring forces exerted by the elevator car on the force sensors;

generating by each of the force sensors a frequency signal with a square-wave form, wherein a frequency of the frequency signal is proportional to the force measured by the force sensor;

receiving at each of the force sensors, except at a first one of the force sensors in the daisy chain, an output signal generated from a previous one of the force sensors in the daisy chain;

each of the force sensors, except the first force sensor, adding the output signal received from the previous force sensor to the frequency signal generated thereby to generate a frequency sum signal as the output signal generated by it;

a last one of the force sensors in the daisy chain forwarding the frequency sum signal to a controller; and determining the load of the elevator car utilizing the controller based on the frequency sum signal forwarded to the controller.

* * * * *